United States Patent
Mao et al.

(10) Patent No.: US 7,035,062 B1
(45) Date of Patent: Apr. 25, 2006

(54) STRUCTURE TO ACHIEVE SENSITIVITY AND LINEAR DENSITY IN TUNNELING GMR HEADS USING ORTHOGONAL MAGNETIC ALIGNMENTS

(75) Inventors: Sining Mao, Savage, MN (US); Eric Shane Linville, Chanhassen, MN (US); Zheng Gao, Savage, MN (US); Brian William Karr, Savage, MN (US); Janusz Jozef Nowak, Edina, MN (US); Olle Gunnar Heinonen, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 344 days.

(21) Appl. No.: 10/302,443

(22) Filed: Nov. 22, 2002

Related U.S. Application Data

(60) Provisional application No. 60/334,227, filed on Nov. 29, 2001.

(51) Int. Cl.
*G11B 5/127* (2006.01)
(52) U.S. Cl. .................................................. 360/324.2
(58) Field of Classification Search .............. 360/324.2, 360/327.32, 324.12; 324/252; 365/173, 365/171
See application file for complete search history.

(56) References Cited

U.S. PATENT DOCUMENTS

| | | | | |
|---|---|---|---|---|
| 5,650,958 A | * | 7/1997 | Gallagher et al. | 365/173 |
| 5,764,567 A | * | 6/1998 | Parkin | 365/173 |
| 6,137,662 A | * | 10/2000 | Huai et al. | 360/327.22 |
| 6,473,279 B1 | * | 10/2002 | Smith et al. | 360/324.12 |
| 6,650,513 B1 | * | 11/2003 | Fullerton et al. | 360/324.2 |
| 6,724,586 B1 | * | 4/2004 | Gill | 360/324.2 |
| 6,741,433 B1 | * | 5/2004 | Nishioka | 360/324.2 |
| 6,765,768 B1 | * | 7/2004 | Saito | 360/319 |
| 6,791,806 B1 | * | 9/2004 | Gao et al. | 360/324.2 |
| 6,833,982 B1 | * | 12/2004 | Jayasekara | 360/324.2 |
| 6,839,205 B1 | * | 1/2005 | Kagami et al. | 360/324.1 |
| 2002/0034056 A1 | | 3/2002 | Chen et al. | |
| 2002/0054462 A1 | * | 5/2002 | Sun et al. | 360/324.2 |
| 2002/0114111 A1 | | 8/2002 | Zhu | |
| 2002/0135947 A1 | * | 9/2002 | Aoki et al. | 360/322 |
| 2002/0135954 A1 | | 9/2002 | Yoshikawa et al. | |
| 2003/0048658 A1 | * | 3/2003 | Chen | 365/158 |
| 2004/0052009 A1 | * | 3/2004 | Ohtsu et al. | 360/324.12 |
| 2004/0174641 A1 | * | 9/2004 | Hayashi et al. | 360/324.12 |
| 2005/0083613 A1 | * | 4/2005 | Yoshikawa et al. | 360/324.1 |

* cited by examiner

*Primary Examiner*—Allen Cao

(57) ABSTRACT

The present invention provides a tunneling magneto-resistive read sensor structure that improves sensitivity and linear density of the sensor structure. The sensor includes first and second electrodes and a stack positioned between the electrodes. The stack includes first and second free layers with magnetization orientations that are biased relative to each other. A tunneling barrier (insulating layer) or non-magnetic metal spacer is positioned between the first and second free layers. A sense current is passed between the first and second free layers of the stack. The amount of current passing through the first and second free layer changes based upon the orientation of the first and second free layers relative to each other.

30 Claims, 8 Drawing Sheets

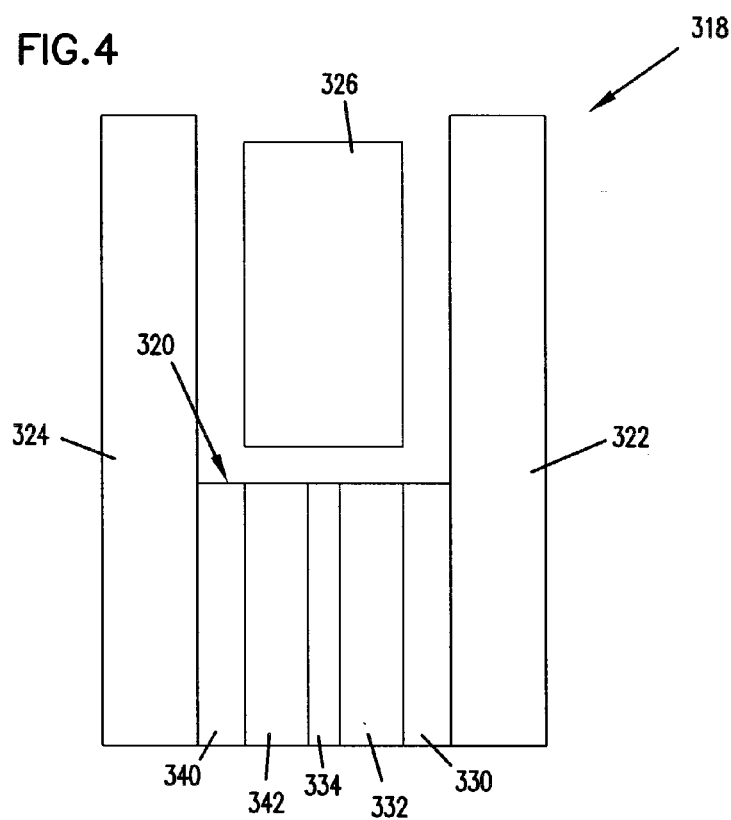
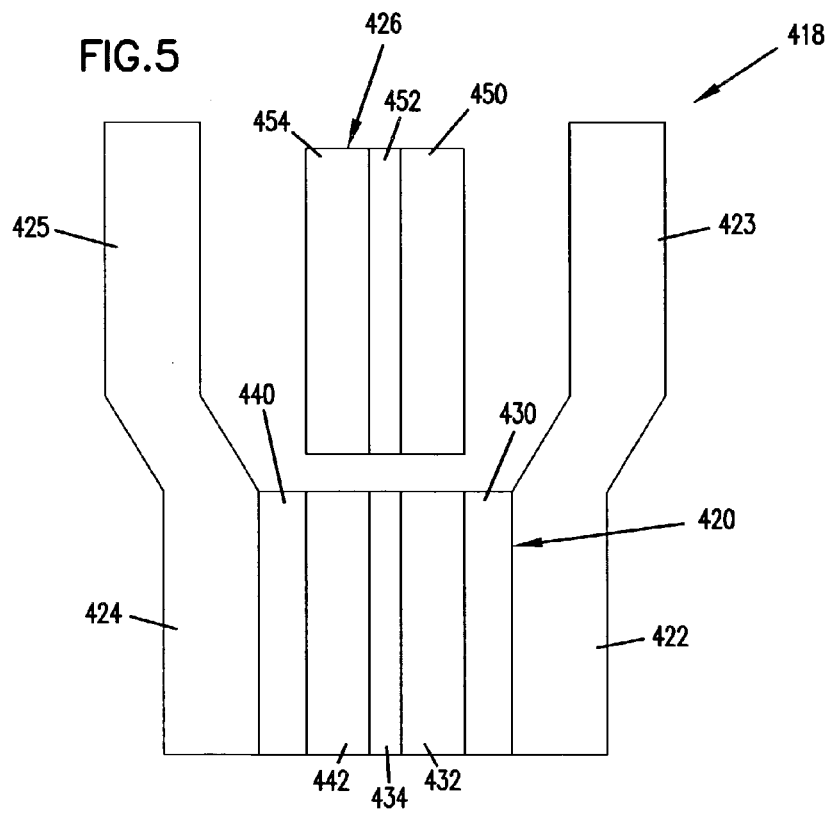

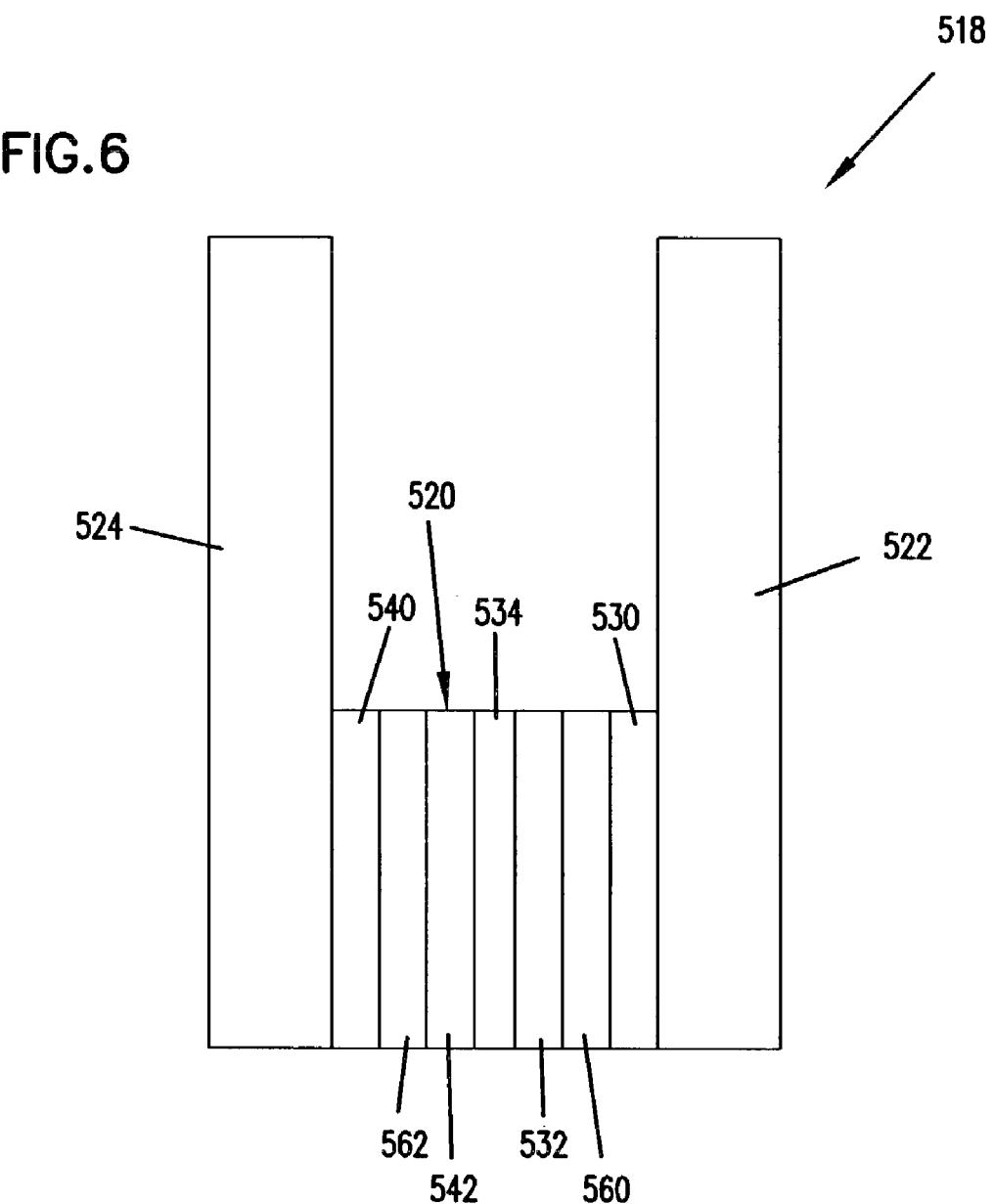

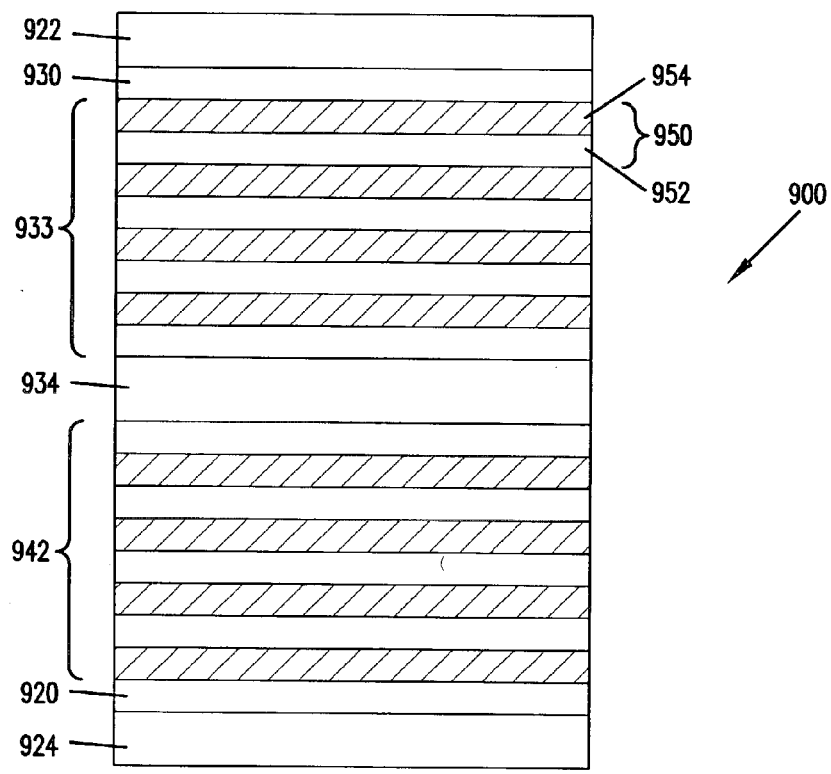
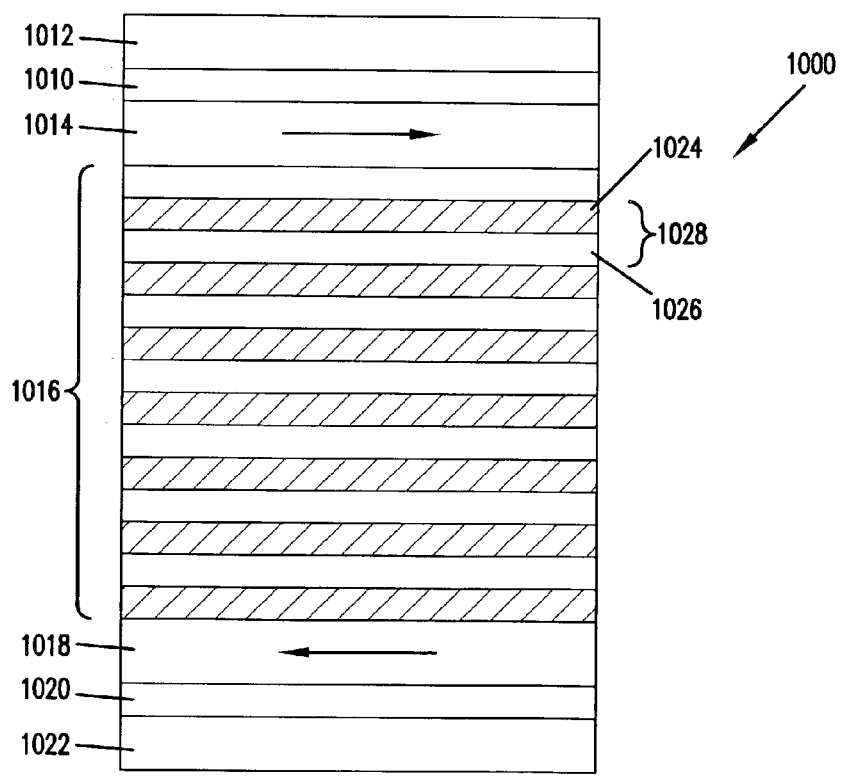

STRUCTURE TO ACHIEVE SENSITIVITY AND LINEAR DENSITY IN TUNNELING GMR HEADS USING ORTHOGONAL MAGNETIC ALIGNMENTS

RELATED APPLICATIONS

This application claims priority of U.S. provisional application Ser. No. 60/334,227, entitled "Structure To Achieve Sensitivity And Linear Density In Tunneling GMR Heads Using Orthogonal Magnetic Alignments" and filed Nov. 29, 2001.

FIELD OF THE INVENTION

This application relates generally to magnetic transducers for reading information bits from a magnetic medium, and more particularly to an improved structure for a tunneling magneto-resistive (TMR) or current-perpendicular-to-plane (CPP) giant magnetoresistance (GMR) read head or other type of CPP ballistic MR read head.

BACKGROUND OF THE INVENTION

A magneto-resistive (MR) element exhibits a change in electrical resistance as a function of external magnetic field. Such property allows MR elements to be used as magnetic field sensors, read heads in magnetic storage systems, and magnetic random-access-memories. In storage systems, the read head reads encoded information from a magnetic storage medium, which is usually a disc coated with a magnetic film. In a read mode, a magnetic bit on the disc modulates the resistance of the MR element as the bit passes below the read head. The change in resistance can be detected by passing a sense current through the MR element and measuring the voltage across the MR element. The resultant signal can be used to recover data from the magnetic storage medium. Depending on the structure of a device, the MR effect can fall into different categories, namely, anisotropic MR (AMR), giant MR (GMR), tunneling MR (TMR), colossal MR (CMR) and ballistic MR (BMR).

As the area densities of a hard disc increase beyond about 10 Gbit/inch$^2$, AMR heads give way to GMR heads due to a GMR head's ability to produce a stronger signal. The GMR device currently manufactured in production by the data storage industry is the spin valve. The spin valve consists of a free layer the magnetization of which rotates with the external field, a non-magnetic metallic spacer layer (typically a Cu spacer or the like), a reference layer, a thin non-magnetic metallic layer (typically Ru), a pinned layer, and an antiferromagnetic pinning layer, such as PtMn or NiMn. The pinned layer has it its magnetization fixed along one direction by virtue of the exchange coupling between the magnetization of the pinned layer and the antiferromagnet, and the magnetization of the reference layer is in a direction anti-parallel to that of the pinned layer magnetization by virtue of the very strong antiferromagnetic coupling promoted between the pinned and reference layers by the thin Ru layer.

In a typical spin valve, the current flows in the plane of the metallic layers. This mode of operation is referred to as current-in-plane (CIP). The electrical resistance of a spin valve is a function of the angle between the magnetization of the free layer and of the reference layer. A sensor exhibits the largest resistance when the two layers are magnetized in anti-parallel directions, and the smallest when they are parallel. For proper operation and optimum sensitivity, the reference layer and free layer should be oriented at 90 degrees to one another. For standard spin valve designs this is accomplished by pinning the reference layer orientation out of the air bearing surface (ABS) of the sensor and biasing the free layer parallel to the ABS with permanent magnets positioned at the sides of the reader. The permanent magnets also act to stabilize the free layer response, ensuring a linear, hysteresis free response over the dynamic range of the free layer. In this configuration the signal output is determined by dynamic response of the free layer to magnetic bit transitions in the medium. The technology of GMR read heads has advanced so that it is possible to read from discs with information area densities up to 100 Gbit/inch$^2$, beyond which point the sensitivity and output signal again becomes an issue.

One possible solution to the limitations of GMR heads is to use tunneling magnetoresistive (TMR) junctions. The standard TMR junction head design is very similar to a spin valve in the sense that it also consists of a free layer, a spacer layer, a reference layer, a Ru layer, a pinned layer, and an antiferromagnetic pinning layer. A major difference between TMR junctions and spin valves is that in the TMR junction the spacer layer is an oxide or semiconductor barrier as opposed to a conductor. Moreover, the electrical current in a TMR junction flows perpendicular to the plane of the films (CPP mode) as opposed to flowing in the plane for spin valve sensors (CIP). Since the spacer layer is an insulator or semiconductor in tunnel junctions, the electrons comprising the current tunnel through the barrier from the free layer to the reference layer. The magneto-resistance rises from the angular difference between the magnetization in the two magnetic layers in a way analogous to a spin valve. However, the TMR signal can be much larger than in spin valves, resulting in more amplitude and sensitivity of the device. Due to the unique nature of tunneling physics and the CPP current flow, TMR junctions offer more room for engineering design because the TMR signal and resistance are not directly related as they are in spin valves. In particular, the resistance of the junction depends only on the barrier thickness and junction area and not on the details of the rest of the stack. In theory, the magneto-resistance of a TMR junction depends only on the polarization of the free and reference layers and is independent of the junction area and the details of the other layers in the stack. In practice, for ultra-thin barriers there is a strong dependence on magnetoresistance as a function of barrier thickness due to processing defects in the barrier. The most common defects are known as pinholes and represent very small discontinuities in the tunneling barrier where the free and pinned layers are in direct contact. The current can shunt through these pinholes and reduce the resistance and magnetoresistance of the stack. In spite of defect limitations, the CPP TMR allows tremendous flexibility in head design, allowing independent optimization of the individual layers of the stack. Additionally, the geometry of the head can be optimized to achieve the best head performance without sacrificing head amplitude.

All types of MR elements typically include shields consisting of high permeability materials such as NiFe alloys. The function of the shields is to protect sensors from the stray magnetic fields originating from all magnetic bits on the medium, except the one just underneath the sensor. For spin valves where the current flows in CIP mode, the active sensor and leads are isolated from the shields by insulator material like metal oxide or nitride. This is to prevent current from leaking into the shields. As the linear density increases, the shield-to-shield spacing must be made smaller to adequately screen the flux from adjacent bits. Spin valves are not well suited to high linear density applications because they require half-gaps, which severely restricts how thin the shield-to-shield spacing can be. On the other hand, TMR junctions allow for the possibility of very small shield-to-shield spacing since the current flows in CPP mode so the half-gaps are not required. If the shields are used as electrodes to the tunnel junction, the shield-to-shield spacing consists of only the stack thickness. Therefore, tunnel junctions are superior to spin valves for high linear density applications. However, the antiferromagnetic pinning layer of a tunnel junction occupies a large proportion of the total stack thickness and provides a further limit to the shield-to-shield spacing for current spin valve and TMR designs. An alternate design to remove this layer would be highly desirable for further pushing the linear density limits of magnetic recording systems.

A further consideration when designing MR elements is the physical track density, or number of tracks per unit length in the radial direction of the disc, in memory media. As the track density increases, the width of the sensor layers has to decrease concomitantly in order for the sensor to fit well within one track. As the width of the sensor decreases, standard permanent magnet abutted junction designs have difficulty in stabilizing the free layer and maintaining an adequate output signal. There is generally a trade-off between providing a strong permanent magnet bias field to ensure a rotational, hysteresis-free response of the free layer and allowing the free layer to respond over a large enough portion of its range to ensure adequate output signal. The larger the permanent magnet bias field the more stable the free layer response, but at the cost of increased free layer stiffness and lower output signal. As the sensor width decreases, the window for providing adequate bias and sensitivity decreases rapidly. This is because a strong magnet field does not decay rapidly enough for narrow sensors, so the whole free layer is essentially pinned, resulting in very low amplitude. On the other hand, a weak permanent magnet bias field is not strong enough to stabilize the free layer edges resulting in head instabilities. Furthermore, shielding of stray magnetic fields originating from adjacent tracks also becomes an issue. The presence of permanent magnets on the sides of the stack prevents shielding of the free layer from adjacent tracks. For these reasons, the viability of current spin valve and TMR abutted junction head designs is very questionable as areal density targets exceed 100 Gb/in$^2$.

Accordingly, there is a need for an MR element that is able to maintain high sensitivity with a relatively large output signal, while meeting the demands of increased linear bit density and track density. The present invention provides a solution to this and other limitations, and offers other advantages over the prior art.

SUMMARY OF THE INVENTION

Against this backdrop the present invention has been developed. The present invention provides a tunneling magneto-resistive or CPP spin valve read sensor structure that improves sensitivity and linear density of the sensor structure. The sensor includes first and second electrodes and a stack positioned between the electrodes. The stack includes first and second free layers with magnetization orientations, which in the absence of any external forces are aligned anti-parallel relative to each other by the magnetostatic interactions between the layers. The magnetization directions of the free layers are then brought into perpendicular alignment by some biasing technique. Examples of suitable biasing techniques are fields from external biasing magnets, or by exchange bias coupling of the free layers to antiferromagnetic layers, or by induced uniaxial anisotropy in the free layers, or by shape anisotropy, or by a combination of any of these mechanisms. A tunneling barrier (insulating or semiconducting layer), in the case of a tunneling magneto-resistive sensor, or a nonmagnetic metallic spacer, in the case of a CPP GMR sensor, is positioned between the first and second free layers. A sense current is passed between the first and second free layers of the stack. As the reader structure is passed over magnetically stored information in a medium disc, the magnetization of both free layers respond to the field emanating from the medium by rotating in opposite directions. The resistance of the read sensor then changes as it depends on the relative orientation of magnetization of the first and second free layers. This results in more sensitivity than the standard designs because both free layers respond and contribute to the output signal.

When applying this read head to a storage system, the system includes a storage medium having a data surface with magnetic data stored in radially spaced data tracks. The system also includes a slider adapted to move across the data surface, a current source providing a sense current, readback circuitry adapted to receive a readback signal and responsively provide a data output, and a magnetoresistive sensor carried on the slider adapted to receive the sense current in a sense current direction substantially parallel to the direction of the data tracks. The sensor reads data from the data surface in response to variations in the magnetic field across the data tracks and provides the readback signal to the readback circuitry. The sensor includes first and second electrodes to make electrical contact to the read structure, and a stack positioned between the electrodes. The stack includes first and second free layers and a tunneling barrier or a non magnetic spacer, preferably Cu, Ag or CuAg alloys, positioned between the free layers. Changes in the magnetic fields of the memory media track create a change in the magnetization orientation of the first and second free layers relative to each other, thereby changing the amount of current passing between the first and second free layers.

These and various other features as well as advantages, which characterize the present invention, will be apparent from a reading of the following detailed description and a review of the associated drawings.

BRIEF DESCRIPTION OF THE DRAWINGS

FIG. 4 is a schematic cross-sectional view of the CPP read head illustrated in FIG. 3.

FIG. 5 is a schematic cross-sectional view of an alternative CPP read head according to the present invention having recessed side shield members to improve flux decay length.

FIG. 6 is a schematic cross-sectional view of an alternative CPP read head according to the present invention having additional antiferromagnetic layers for biasing the free layers.

FIG. 11 is a schematic cross-sectional view of an alternative stack embodiment utilizing multilayer free layer.

FIG. 12 is a schematic cross-sectional view of an alternative stack embodiment utilizing a periodically modulated spacer layer consist of n repeats of a bilayer conductor.

DETAILED DESCRIPTION

Figure 1:
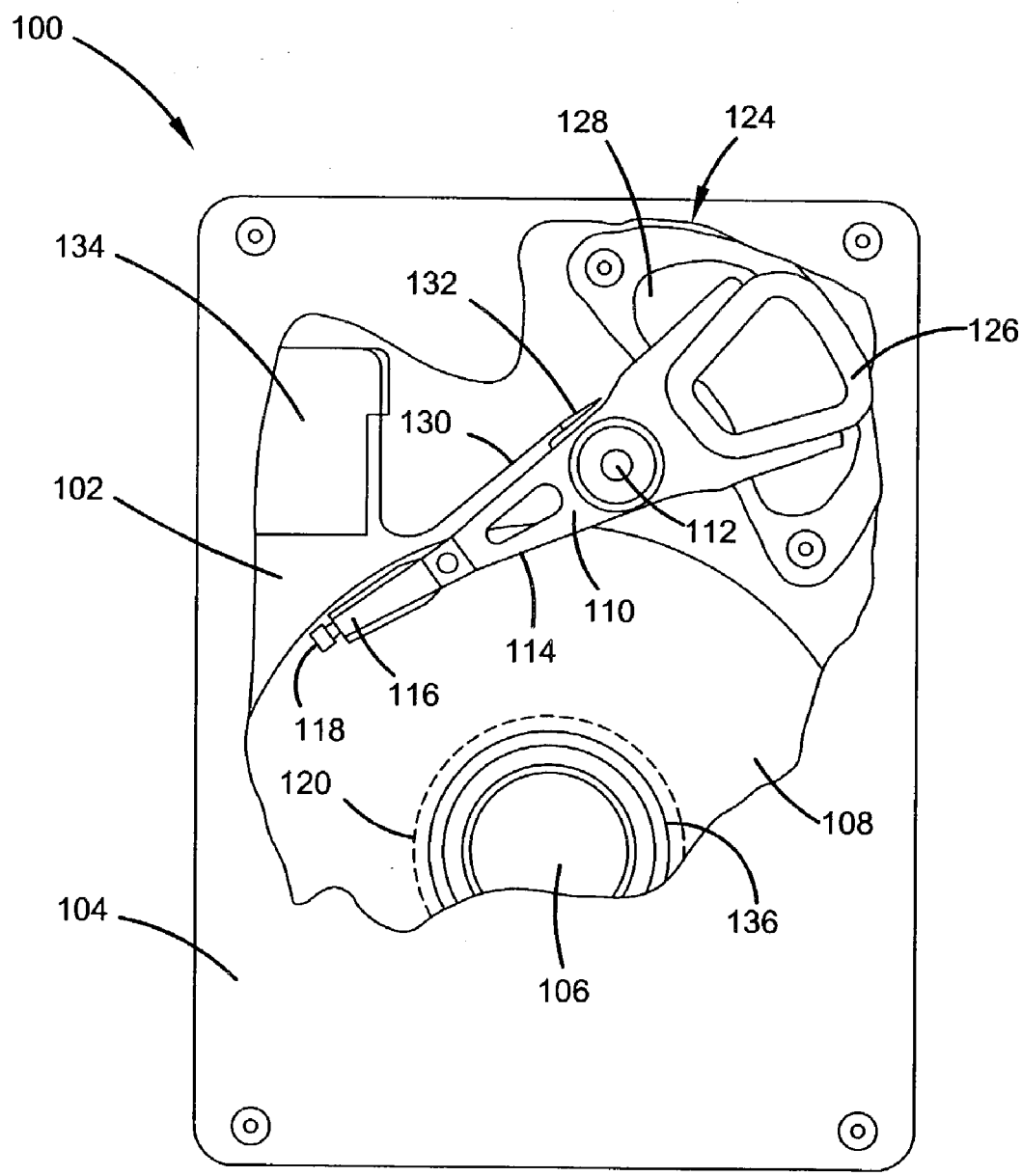
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108 to read from or write to tracks 136 on the disc.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
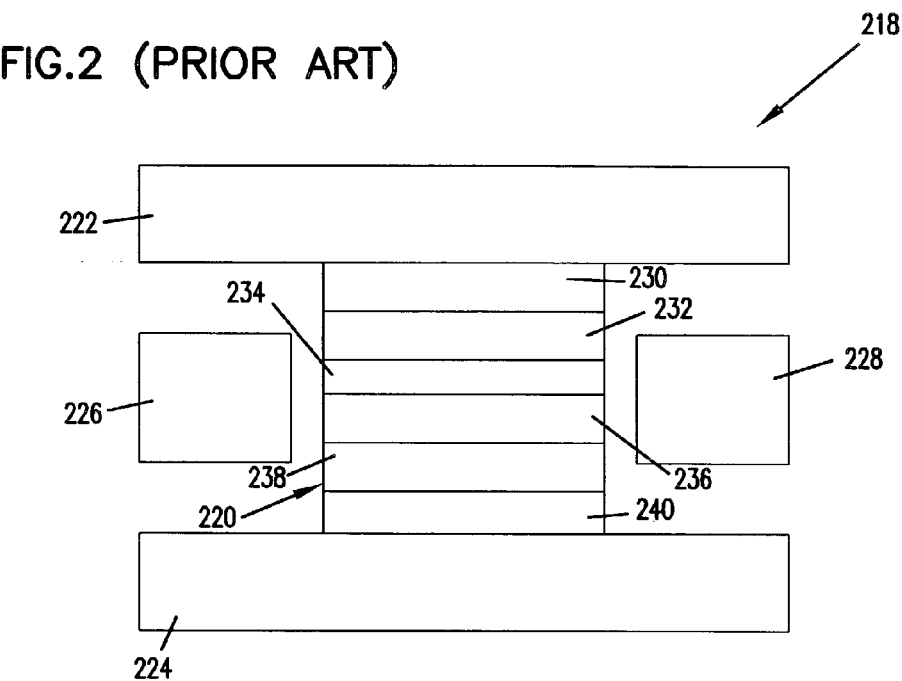
FIG. 2 is a schematic front view of a prior art TMR head.

Referring now to FIG. 2, a basic design of a TMR head 218 of the prior art is shown. Head 218 includes a TMR stack 220, a top shield 222, a bottom shield 224 and first and second permanent magnets 226 and 228. FIG. 2 illustrates head 218 from a front view, that is as viewed from the memory media surface or air bearing surface (ABS) facing upward towards the head. Head 218 is aligned relative to a memory media track so that the direction in which the top shield, stack and bottom shield are aligned is parallel to and aligned with a direction of the track.

Stack 220 includes a cap/contact layer 230, a free layer 232, an insulating layer 234, a reference layer 235, a thin metallic spacer 235b, a pinned layer 236, a pinning layer 238, and a seed/contact layer 240. Stack 220 is positioned between the top and bottom shields with the cap and seed layers contacting top and bottom shields 222 and 224, respectively. The free layer 232 is separated from the reference layer 235 by insulating layer 234. The pinned layer 236 has a magnetization that is pinned in a predetermined orientation by the pinning layer 238, and a strong antiferromagnetic interaction between the reference layer 235 and the pinned layer 236, mediated by the thin spacer 235b, keeps the magnetization directions of the reference layer 235 and the pinned layer 236 antiparallel. Permanent magnets 226 and 228 are positioned on opposite sides of stack 220 to fix the orientation of free layer 232 parallel to a surface of the memory media. Top and bottom shields 222 and 224 may be connected to first and second electrodes, respectively, or may act as first and second electrodes for passing and collecting currents in the read head.

There are various limitations associated with the design of prior art TMR heads, such as head 218. First, the permanent magnets 226 and 228 are positioned very close to stack 220 in part to exert a sufficient amount of force on free layer 232 to orient it properly. However, permanent magnets 226 and 228 cannot be too close to stack 220 or shields 222 and 224 or else a shunting effect will occur where the sensing current being passed through the stack between top and bottom shields 222 and 224 will be directed in part into one or both of the permanent magnets, thus reducing the signal from the read head. Furthermore, when the permanent magnets 226, 228 are positioned relative to stack 220, as shown in FIG. 2, there is little to no opportunity for shielding stack 220 along the sides of the stack. Shielding along the sides of stack 220 may be useful in preventing bit flux from adjacent tracks interfering with the track being read by head 218.

A second issue associated with the configuration of head 218 is that the stack 220 must be made thin enough to fit between the shields 222 and 224 as the shield-to-shield spacing is reduced with increased linear density. Because the cap and seed layers, the free layer, the reference layer, the pinned layer, and the pinning layer each require a minimum thickness to perform their intended purpose, the total thickness of the stack 220 cannot be made arbitrarily small. For example, the thickness of the stack cannot be meaningfully reduced by controlling the thickness of the insulating barrier. This is because the sensor resistance is a strong function of barrier thickness. To get reasonable resistance values, the barrier is only a few angstroms thick and does not contribute much to the overall shield-to-shield spacing. However, the pinning layer and synthetic antiferromagnetic contribute a large proportion of the total stack thickness, and ultimately limit the ability to achieve very narrow shield-to-shield spacing.

A further issue associated with the head configuration of FIG. 2 is related to the position of permanent magnets 226 and 228 along the sides of stack 220. As the stack width continues to be reduced in order to meet the demands of increased track density requirements, it becomes more difficult to bias the magnetization orientation of the free layer in a predictable, reliable way. Such biasing issues may affect the efficiency and accuracy of head 218 in reading from a memory media track.

Figure 3:
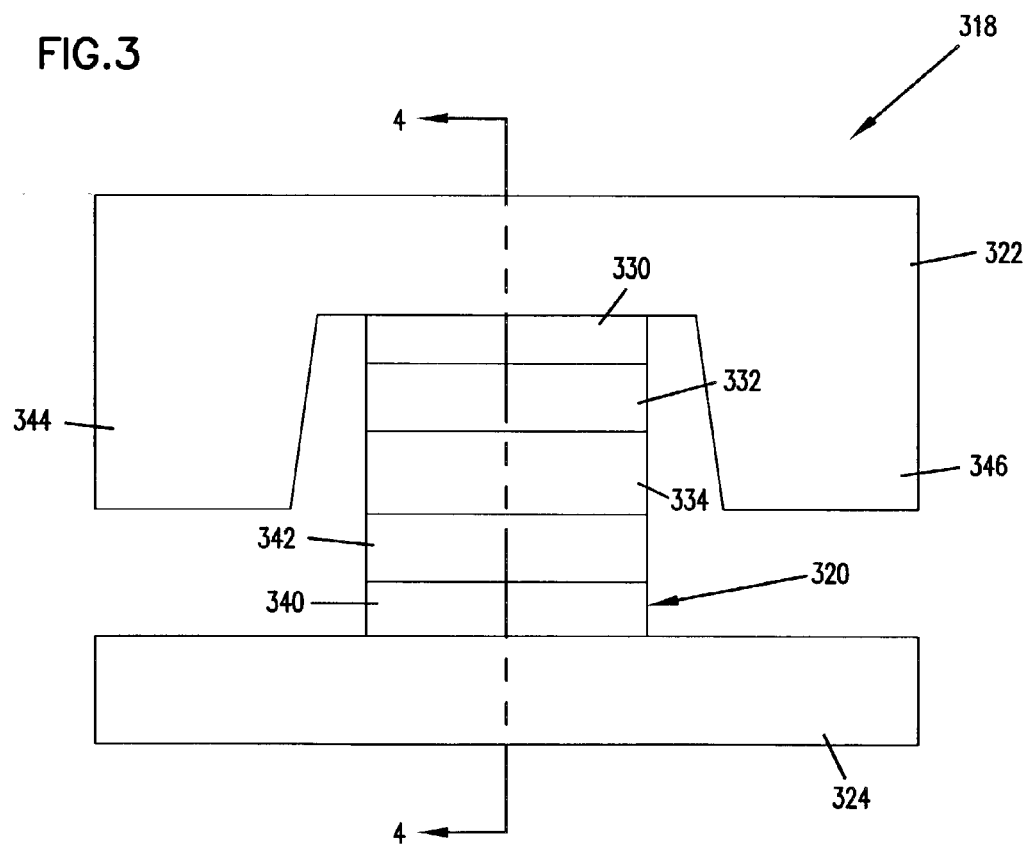
FIG. 3 is a schematic front view of a preferred embodiment of a CPP read head of the present invention having additional shielding on the sides of the stack to reduce stray flux.

Now turning to FIG. 3, the present invention addresses the above noted and other limitations associated with TMR read heads. Read head 318, illustrated in FIG. 3, includes a stack 320, a top shield 322, a bottom shield 324, and a single permanent magnet (see 326 in FIG. 4). In this configuration, permanent magnets are not positioned at the sides of stack 320, as in head 218, but rather a single magnet is positioned at the rear of the stack (see 326 in FIG. 4). There are several advantages associated with positioning the permanent magnet 326 at the rear of the stack, which are discussed below.

Head 318 differs from the prior art in that it includes two free layers 332 and 342 in stack 320 separated by an insulating layer or a non-magnetic metal spacer in a "tri-layer" design. Stack 320 includes a cap layer 330 contacting top shield 322, a first free layer 333, an insulating layer, semi-conducting layer or a non-magnetic metal layer 334, a second free layer 342, a seed layer, and an electrode contacting bottom shield 324. Magnetostatic interactions between the two free layers tend to align the magnetizations of the free layers in anti-parallel directions relative to each other in the absence of other external magnetic fields or forces. By biasing the two free layers 332 and 342 by the permanent magnet 326, the magnetization of the free layers are brought in orthogonal alignment relative to each other in the remnant state. Providing two free layers that each sense the bit flux greatly increases the sensitivity of the head because an even smaller amount of change in bit flux will create movement in each free layer, thus increasing the change in angle between the magnetizations in the two free layers compared to the prior art TMR or CPP spin valve, in which only a single free layer rotates. Therefore, the present invention produces a more sensitive head.

A further advantage of head 318 is that there is no pinning layer (typically an anti-ferromagnetic material) required in stack 320. By removing both the pinning layer and synthetic antiferromagnet, with their associated required thickness, there is a greater possibility to reduce the thickness of the stack. Removing the pinning layer provides an additional advantage over prior art MR heads that relates to thermal reliability. Typically, the materials used for the pinning layer produce a large amount of heat, relative to the heat generated in the reference, pinned or free layer, as the sense current is passed through it. Heat in the stack may affect the reliability of the read head and reduce the lifetime of the read head. Thus, removing the pinning material also reduces these negative thermal-related issues in the read head.

A further advantage of positioning permanent magnet 326 at the rear of stack 320, is that there is now space along the sides of the stack for optional shielding against stray magnetic flux from adjacent tracks. FIG. 3 illustrates shield members 344 and 346, which are extensions from top shield 322, positioned along sides of stack 320. In other embodiments, side shield members 344 and 346 may extend from bottom shield 324, or from both the top and bottom shields 322 and 324. The shield members 344 and 346 must be spaced from the sides of stack 320 in order to prevent undesired shunting through the sides of the stack. Further, shield members 344 and 346 must not connect to both of the top and bottom shield members 322 and 324 or a similar undesired shunting effect may occur.

Another advantage of the "tri-layer" design of head 318 (two free layers and an insulating, semi-conducting, or non-magnetic barrier) with the associated positioning of permanent magnet 326 at the rear of stack 320, is that the permanent magnet is only required to provide a bias of free layers 332 and 344 by rotating them away from anti-parallel alignment. Such bias of the free layers to a certain magnetization orientation requires a much smaller magnetic force than the magnetic force necessary for the prior arts head 218, in which the permanent magnets both have to bias the free layer magnetization and also stabilize it, that is, provide a strong enough magnetic force that the free layer magnetization responds reversibly to external fields.

Biasing of the first and second free layers can be accomplished with several different head designs. For example, the permanent magnet 326 of FIG. 4 that is positioned at the rear of the stack provides the necessary biasing of the first and second free layers 332 and 342. Because permanent magnet 326 is only required to provide a bias force, and not a stabilizing or fixing force, the permanent magnet may be insulated. An insulated permanent magnet can be positioned adjacent to or even touching the stack without creating unwanted shunting between the shields. Typical existing insulating permanent magnets do not provide a strong enough magnetic field both to bias and stabilize the free layer magnetization in the prior art read head.

In another embodiment of a read head 418, shown in FIG. 5, the permanent magnet 426 includes multiple layers that together created the necessary biasing of first and second free layers 432 and 442. Head 418 includes top and bottom shield members 422 and 424 and a stack 420 that includes cap and seed layers 430 and 440, first and second free layers 432 and 442 and insulating or non-magnetic metal layer 434. Permanent magnet 426 includes a soft magnetic layer 452 positioned between two anti-ferromagnetic layers 450 and 454. Permanent magnet 426 may function in a similar way with a similar effect as a permanent magnet 326 of head 318.

In addition to the side shielding portions 344 and 346 shown in FIG. 3, the shields may include other features that enhance the sensitivity and reliability of a read head. For example, the top and bottom shield members 422 and 424 of head 418 may include recessed shield portions 423 and 425, respectively. The recessed portions of the shield may improve the flux decay length of bit flux readings taken from the memory media track that are lost into the shield portions of the head. Decreases in flux decay into the shields may lead to a stronger output signal of the read head as a larger fraction of the flux emanating from the media is sensed by the reader.

In a yet further read head embodiment 518 of the present invention, shown in FIG. 6, the biasing of the free layers is performed by anti-ferromagnetic layers positioned within stack 520. Stack 520 may include cap and seed layers 530 and 540 positioned next to shields 522 and 524, free layers 532 and 562, an insulating or non-magnetic metal layer 534, and anti-ferromagnetic layers 560 and 562. Each anti-ferromagnetic layer 560 and 562 biases the free layer adjacent to it so that the magnetization of free layers are biased (preferably orthogonal) to each other due to the exchange bias coupling to the antiferromagnetic layers and the magnetostatic interactions between the free layers. Because the anti-ferromagnetic layers are only required to bias rather than pin/fix the magnetization of the adjacent free layer, layers 560 and 562 may be relatively thin compared to a pinning layer, thus adding minimal height to stack 520. The two AFM layers can have different blocking temperatures so a 90 degree setting can be realized. The AFM layers may include the following material: IrMnX where X=Cr, Ti, Re, Ta, Cu, Pt, Ni, Fe, or Co for the best blocking temperature adjustment.

Figure 7:
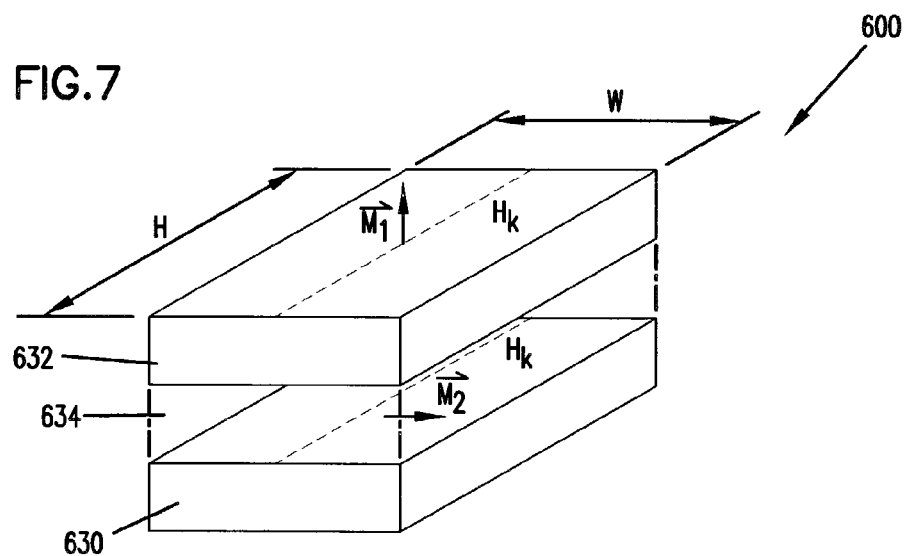
FIG. 7 is a schematic cross-sectional view of an alternative stack embodiment utilizing free layer self anisotropy field to stabilize and bias the operating point.

In a yet further stack configuration 600, shown in FIG. 7, free layers 630, 632 are biased (preferably orthogonal) relative to each other due to their shape anisotropy (the height "H" versus width "W" of the free layer material). By making the free layers taller in the direction up from the recording disc than they are wide in the direction across the recording tracks, magnetostatic interactions within each layers will exert a force along the longer dimension of the reader. By properly dimensioning the aspect ratio of the reader and the thickness of a spacer 634 positioned between the free layers, the net magnetostatic force will bias the free layer in directions orthogonal to one another.

Figure 8:
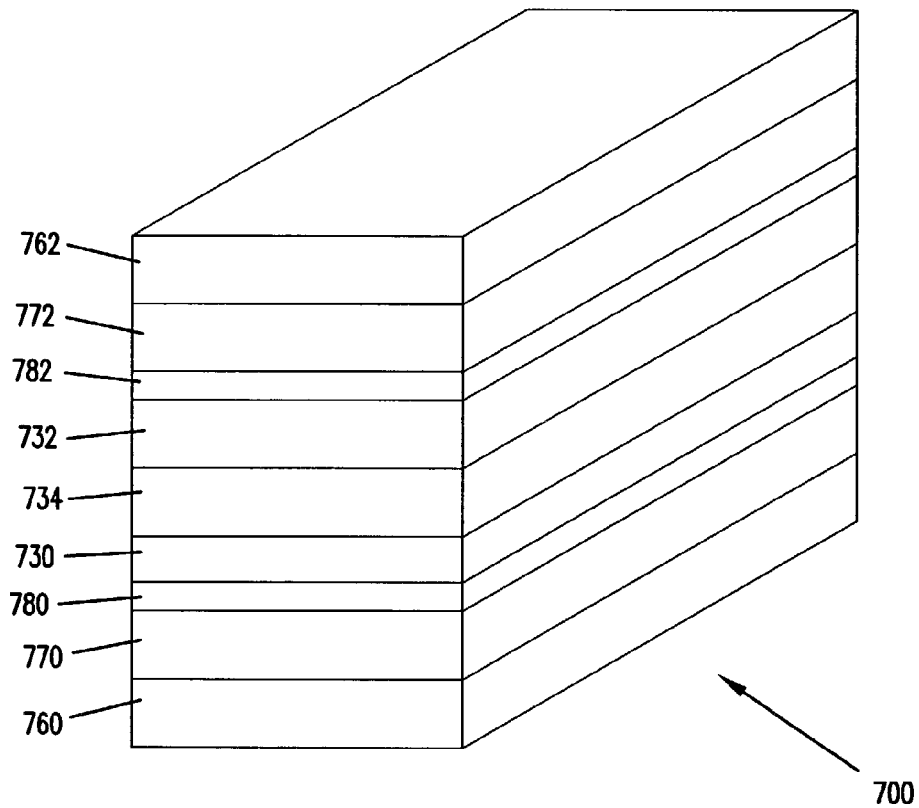
FIG. 8 is a schematic cross-sectional view of an alternative stack embodiment utilizing an in-stack soft bias scheme to achieve the orthogonal operating magnetic configurations.

Another tri-layer CPP head embodiment 700, shown in FIG. 8, utilizes an in-stack bias scheme to make the two sensing layer biased orthogonal. Head 700 comprises a basic Trilayer CPP stack of free layers 730, 732 and an oxide spacer 734. Soft magnetic layers 770, 772 are stabilized by AFM layers 760, 762, which provide unidirectional exchange fields at the FM/AFM interfaces. The FM/AFM layer pair is referred to as a soft-bias layer. This soft bias layer should be placed both on top of and underneath free layers 730, 732 with nonmagnetic spacer layers 780, 782. The magnetic flux from the soft-bias layer should be smaller than the magnetic flux of the free layer, resulting in a complete flux balanced structure that provides maximum magnetic stability performance. The structure of FIG. 8 may also offer several process advantages since there is no need to have lateral electrical insulation as in other embodiments. Seed layers and cap layers may also be needed to protect the stack.

The read heads described above with reference to FIGS. 3–8 that contain two free layers and an insulating, semiconducting, or conducting barrier in CPP mode may not provide enough sensitivity as the areal density approaches the range of terabits/in$^2$ In this case, the bit size is only a few tens of nanometers and the read head must scale with this dimension. The sensitivity of the read head becomes critically important and more exotic stack designs will be required to meet the signal-to-noise requirements for proper head operation. The alternative stack embodiments that follow are readily incorporated into the basic reader designs 318, 418, and 518 described above by substituting the alternative stacks for any of stacks 32Q 420, and 520.

Figure 9:
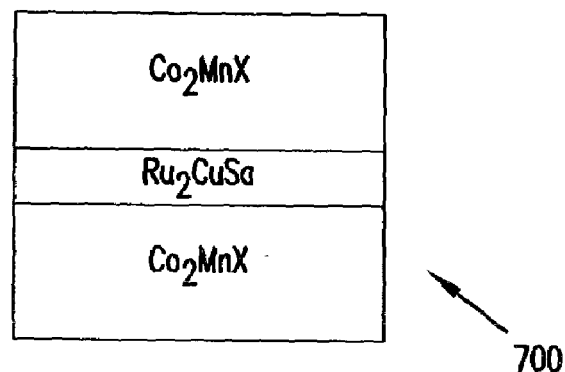
FIG. 9 is a schematic cross-sectional view of an alternate stack embodiment utilizing the Huestler alloy layers in the stack.

One alternative stack embodiment 700, shown in FIG. 9, takes advantage of a novel metal system high spin polarization efficiency to increase the GMR or TMR effect and thus increasing the output signal. This particular metal system is called Heusler Alloys. The structure of such a device consists of the following layers:

FM layer 1/spacer/FM layer 2.

FM layers 1 and 2 may be made of the same materials of either Co$_2$MnX (where X=Ge, Si, Al, Sn, or Ga) or XMnSb (where X=Ni, Pt, Co, Fe, or Cr). The spacer may be made of an oxide layer as stated above for a Heusler tunneling CPP device or a metal spacer made of Cu, CuAg, or Rh$_2$CuSn that creates a CPP-GMR effect.

Figure 10:
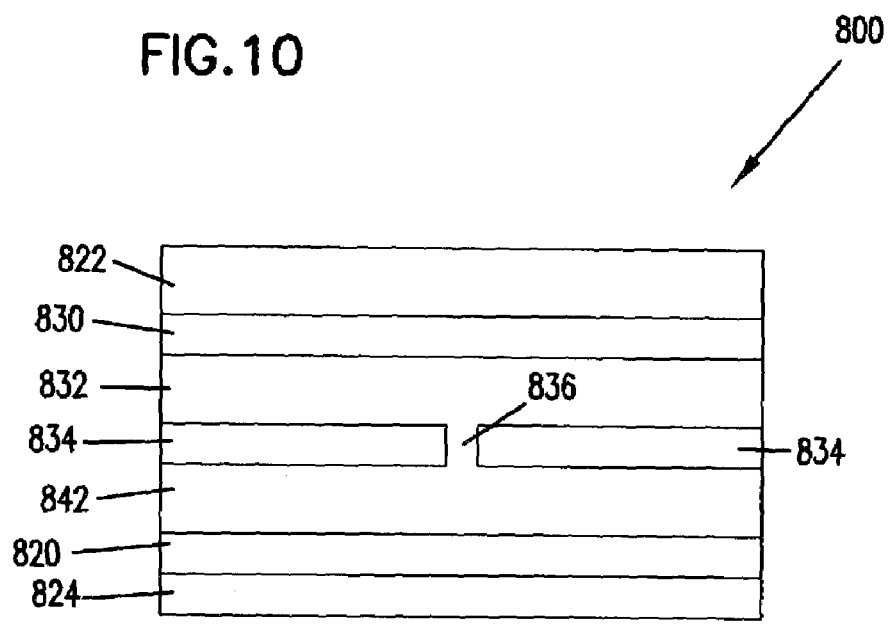
FIG. 10 is a schematic cross-sectional view of an alternative stack embodiment utilizing the ballistic magnetoresistance effect (BMR).

Another alternate stack embodiment 800 takes advantage of the ballistic magnetoresistance (BMR) in magnetic nanoconstrictions. It has been shown that BMR values of over 3000% can be achieved at room temperature in Ni nanocontacts at switching fields of only a few hundred oersteds. These values are two orders of magnitude larger than the magnetoresistance currently obtainable in standard CPP GMR and TMR designs. FIG. 10 shows a schematic of a stack 800 utilizing the ballistic MR effect. The stack consists of two free layers 832 and 842 separated by an insulating layer 834 with a nanobridge 836 in the insulating layer connecting the two free layers 832 and 842. The nanobridge 836 may be as small as 10 nm. Stack 620 includes a cap layer 830 contacting top shield 822, a first free layer 832, an insulating layer 834, a nanobridge in the insulating layer 834, a second free layer 842, a seed layer 820, and an electrode contacting bottom shield 824.

A further alternate stack embodiment 900, shown in FIG. 11, consists of multilayer free layers. In this case the barrier consists of an insulating, semiconducting, or non-magnetic metal spacer layer and each free layer consists of a series of ferromagnetic layers separated by non-magnetic spacer layers. This configuration leads to very strong ferromagnetic couplings between the ferromagnetic layers as a well as enhanced GMR/TMR effect. FIG. 11 shows a schematic of a stack 900 utilizing multilayer free layers. Stack 900 includes a cap layer 930 contacting a top shield 922, a first free layer 933, a semi-conducting layer or a non-magnetic metal layer 934, a second free layer 942, a seed layer 920, and an electrode-contacting bottom shield 924. The first and second free layers 933, 942 are further sub-divided into n repeat units 950 of ferromagnetic/non-magnetic spacer layers 952, 954. The non-magnetic spacer layer can be chosen to be any of the following: Cu, Ag, CuAg, CuAu, Ru, Rh, or Cr.

Another stack embodiment 1000 consists of two free layers separated by a periodically modulated spacer having a superlattice structure with n repeats of a bilayer conductor. These systems can exhibit a metal-insulator transition that is driven by an external magnetic field. This configuration gives rise to an effect called phenomenal magnetoresistance (PMR), which can be much larger than CMR and occur at much lower switching fields. The insulator behavior of the spacer results from quantum reflections and interference effects within the structure. By tuning the spacer supercell size, the PMR effect can be obtained. The maximum MR is controlled by the number n of supercell repeats, and increases exponentially as n increases. In addition, as n increases the switching field decreases into a range suitable for use in MR read heads.

FIG. 12 shows a schematic of the stack 1000 utilizing the PMR effect. Stack 1000 includes a cap layer 1010 contacting a top shield 1012, a first free layer 1014, a periodically modulated spacer layer 1016, a second free layer 1018, a seed layer 1020, and an electrode-contacting bottom shield 1022. The periodically modulated spacer layer 1016 consists of n repeats of a bilayer conducting layer 1028, consisting of a first metal layer 1024 and second metal layer 1026.

FIGS. 13A–F show another alternate stack embodiment 1100 that relies on precise engineering of pinholes in a standard TMR stack at specified locations relative to a spacer 1112 and first and second ferromagnetic layers 1114, 1116 of a CPP GMR structure to obtain an oxide pinhole mesh. The pinhole mesh design creates an array of nanoconstrictions that may further enhance the BMR signal obtainable from a single nanoconstriction as described above. The oxide pinhole mesh may be a very thin layer of Al$_2$O$_3$, HfO or TiO$_2$, ZrO, TaO, and alloying oxide of these compounds. The thinness of the oxide pinhole mesh should be within 0.8 nm in thickness and should be utilized within a current-confined structure that possesses a TMR/GMR effect.

Figure 13A:
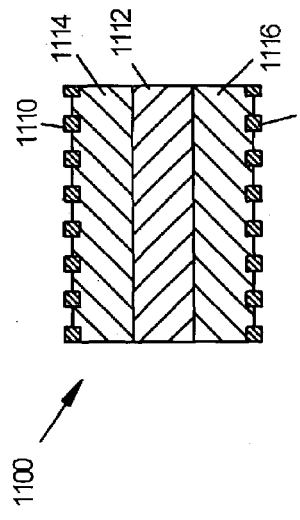
FIGS. 13A–F are schematic cross-sectional views of alternative stack embodiments utilizing varying positions of pinholes in a stack.
Figure 13B:
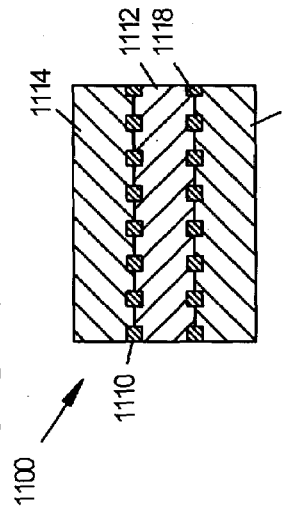
Figure 13C:
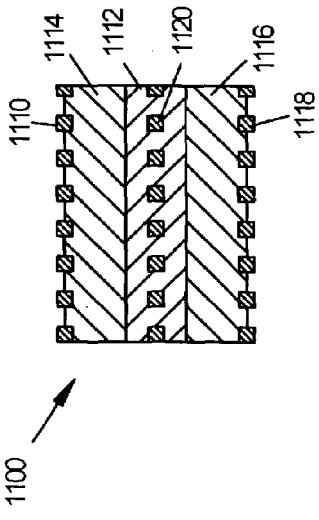
Figure 13D:
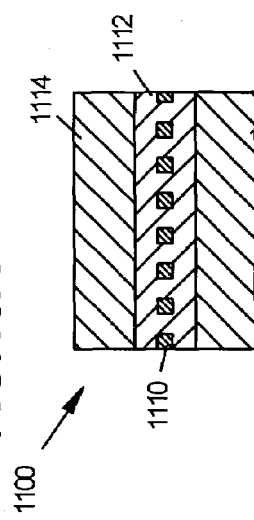
Figure 13E:
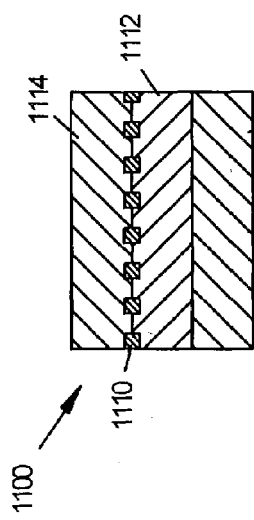
Figure 13F:
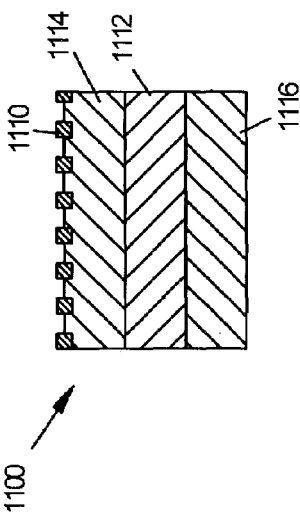

Each oxide pinhole mesh arrangement shown in FIGS. 13A–F provides the nanoconstriction advantages discussed above. FIG. 13A illustrates a first oxide pinhole mesh 1110 inserted within the spacer 1112. FIG. 13B illustrates a first oxide pinhole mesh 1110 positioned at an interface of the first ferromagnetic layer 1114 and the spacer 1112. FIG. 13C illustrates a first oxide pinhole mesh 1110 positioned at an outer surface of the first ferromagnetic layer 1114. FIG. 13D illustrates a first oxide pinhole mesh 1110 positioned at an outer surface of the first ferromagnetic layer 1114 and a second oxide pinhole mesh 1118 positioned at an outer surface of the second ferromagnetic layer 1116. FIG. 13E illustrates a first oxide pinhole mesh 1110 positioned at an inner surface of the first ferromagnetic layer 1114 and a second oxide pinhole mesh 1118 positioned at an inner surface of the second ferromagnetic layer 1116. FIG. 13F illustrates a first oxide pinhole mesh 1110 positioned at an outer surface of the first ferromagnetic layer 1114, a second oxide pinhole mesh 1118 positioned at an outer surface of the second ferromagnetic layer 1116, and a third oxide pinhole mesh 1120 inserted within the spacer 1112.

The various layers of the read heads and stacks described above with reference to FIG. 3–9 may be made of various materials that may provide certain advantages. For example, the free layers can be made of two layers of NiFe and CoFe, or of a synthetic anti ferromagnet (SAF) type of structure. The free layer may also be made of amorphous magnetic materials such as CoZnTi or CoZnNi.

The insulating or barrier layer may be made of an oxide with negative interlayer coupling fields (such as HfO$_2$) or other barriers like nitride and carbide and semiconductors with narrow band gap. The insulating layer may also be made of alumina, TiO$_2$, TaO$_x$, Y$_2$O$_5$, or MgO. In some embodiments, the insulating layer may be made of amorphous Si, Ge, semiconductor materials GaN and GaAs, or other oxides like Zr, TaO, YO, or the alloy of such oxides, such as HfAlO. In other embodiments, the insulating layer may be an organic material. If a non-magnetic metallic spacer or periodically modulated spacer layer is used instead of an insulating barrier, it may be made of Cu, Ag, or Cu—Ag alloys.

In a manufacturing context, the layers of the stack, in particular the insulating layer, may be formed by atomic layer deposition (ALD), by reactive sputtering of aluminum, or by sputtering of aluminum oxide.

The various configurations described above provide improved magnetic stability. The structure of each head embodiment described above is intrinsically stable because only a small bias is needed to bias the free layers, as opposed to the high stabilizing/fixing magnetic forces required in prior art MR and TMR read heads. The present invention also provides improved stability due to the wider range of materials that may be used for the cap/seed contact layers as well as the anti-ferromagnetic layers that maybe used to bias the free layers. Fewer materials limitations may provide for the use of alternative materials or combinations of materials that would provide greater stability in the read head.

An additional benefit to the present invention is that the stack is not required to include an anti-ferromagnetic material. By their nature, anti-ferromagnetic materials typically generate a large amount of heat when a current passes through them. Increased heat in the read head tends to deteriorate performance of the head and may lead to a decreased life span of the head. In the case where an anti-ferromagnetic material is used to bias the free layers, the AFM layer may be very thin, thus creating a minimal amount of heat.

A yet further advantage of the present invention is that the read head is relatively insensitive to variations in stripe height as the read head moves across a memory media surface. A permanent magnet being positioned at the rear of the stack or integrated into a tri-layer TMR stack in the form of weak anti-ferromagnetic biasing members provides a robust design that produces a strong output signal. In the case of a permanent magnet bias, the field from the permanent magnet is strong enough at the back edge of the reader closest to the permanent magnet to essentially align the magnetization in the free layers at this edge parallel to the magnetization of the permanent magnet. Farther down towards the air-bearing surface of the reader, the field from the permanent magnet decays rapidly and the magnetizations in the free layers move towards an orthogonal orientation due to the magnetostatic interactions between the free layers. As a result, the net field acting on the free layers near the air-bearing surface may be rather weak, allowing for a more sensitive response of the free layer magnetizations to fields emanating from the media disc. At the same time, the exchange interactions within each layer ensure that the magnetization in each layer rotates coherently and reversibly. In contrast, in the prior art TMR reader, the biasing and stabilizing field from the permanent magnets is typically as strong along the air-bearing surface of the reader as it is at the back edge of the reader, which greatly reduces the response of the free layer near the air-bearing surface.

The present invention provides a tunneling or CPP magneto-resistive read sensor structure that improves sensitivity and linear density of the sensor structure. The sensor includes first and second electrodes and a stack positioned between the shields. The stack includes first and second free layers with magnetization orientations that are biased relative to each other. A tunneling barrier or non-metallic spacer is positioned between the first and second free layers. A sense current is passed between the first and second free layers of the stack. The amount of current passing through the first and second free layer changes based upon the orientation of the first and second free layers relative to each other. In addition, other alternate stack embodiments described above can be substituted for the standard tunneling or CPP GMR stacks to achieve higher sensitivity and still benefit from the advantages of the present invention.

When applying this read head to a storage system, the system includes a storage medium having a data surface with magnetic data stored in radial spaced data tracks. The system also includes a slider adapted to move across the data surface, a current source providing a sense current, readback circuitry adapted to receive a readback signal and responsively provide a data output, and a magnetoresistive sensor carried on the slider adapted to receive the sense current in a sense current direction substantially perpendicular to a direction of the data tracks. The sensor reads data from the data surface in response to variations in the magnetic field across the data tracks and provides the readback signal to the readback circuitry. The sensor includes first and second shields each having a magnetization orientation, and a stack positioned between the shields. The stack includes first and second free layers and a tunneling barrier or non-metallic spacer layer positioned between the free layers. Alternately, the stack can consist of one of the alternate embodiments disclosed above. Changes in the magnetic fields of the memory media track create a change in the magnetization orientation of the first and second free layers relative to each other, thereby changing the amount of current passing between the first and second free layers.

The configurations of the present invention shown in FIGS. 3–9 address many of the above recited limitations associated with prior art MR heads, particularly TMR heads with permanent magnets positioned on opposing sides of the stack. The present invention meets the requirements of increased linear bit densities as well as increased track densities, while at the same time increasing the output signal of the head that thereby improves the sensitivity of the read head.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A magnetoresistive read sensor comprising:
   first and second electrodes; and
   a stack positioned between the electrodes, the stack comprising a first free layer and a second free layer, and a tunneling barrier positioned between the first and second free layers;
   wherein a current is passed between the first and second free layers of the stack and the amount of current passing through the first and second free layer changes based upon the magnetization orientation of the first and second free layers relative to each other.

2. The sensor of claim 1, wherein the electrodes are configured to be shield members.

3. The sensor of claim 1, wherein the stack further comprises cap layers positioned between the free layers and the electrodes.

4. The sensor of claim 2, wherein the stack comprises first and second sides aligned in the direction current passes between the free layers and in a direction parallel to a track of a memory media from which the sensor reads, and front and rear sides aligned perpendicular to a surface of the memory media, the front side being positioned adjacent the memory media.

5. The sensor of claim 4, further comprising a biasing member positioned adjacent the stack to bias magnetization vectors of the first free layer orthogonal to magnetization vectors of the second free layer.

6. The sensor of claim 5, wherein the biasing member is positioned adjacent the rear side of the stack.

7. The sensor of claim 6, wherein the biasing member comprises a soft magnetic layer coupled with an AFM layer.

8. The sensor of claim 5, wherein the biasing member comprises an AFM layer positioned in the stack adjacent each of the free layers.

9. The sensor of claim 1, wherein the free layers are biased orthogonal to each other due to their shape induced anisotropy.

10. The sensor of claim 1, wherein the free layers are biased by another in-stack soft biased layer of AFM/FM pair on top and underneath the free layers.

11. The sensor of claim 4, wherein the stack further comprises third and fourth sides, and the shield members are configured to shield the first and second sides of the stack and a portion of the third and fourth sides of the stack.

12. The sensor of claim 5, wherein the biasing member is insulating.

13. The sensor of claim 1, wherein the tunneling barrier is configured to be a non-metallic spacer.

14. The sensor of claims 1, wherein the tunneling barrier is configured to be an insulating layer with a nanobridge in the insulating layer connecting the first and second free layers.

15. The sensor of claim 1, wherein the tunneling barrier is configured to be an oxide pinhole mesh.

16. The sensor of claim 1, wherein the tunneling barrier is configured to be a periodically modulated spacer having a superlattice structure with n repeats of a bilayer conductor.

17. The sensor of claim 1, wherein the free layer is configured to be a Heusler magnetic layer comprising materials from the group consisting of $Co_2MnGe$, $CoMnSi$, $Co_2MnAl$, $Co_2MnSn$, $Co_2MnGa$, $NiMnSb$, $PtMnSb$, $CoMnSb$, $FeMnSb$, $CrMnSb$.

18. A magnetoresistive sensor capable of sensing changes in magnetic fields from a memory media track, comprising:
    first and second electrodes;
    first and second free layers each having a magnetization orientation, the magnetization orientation of the layers being orthogonal to each other, and
    an insulation layer positioned between the first and second free layers;
    wherein changes in the magnetic fields of the memory media track create a change in the amount of current passing between the first and second electrodes and thereby the first and second free layers based upon the magnetization orientation of the first and second free layers relative to each other.

19. The sensor of claim 18, further comprising a biasing member capable of biasing the magnetization orientation of at least one of the first and second free layers.

20. The sensor of claim 19, wherein the biasing member is positioned above the stack relative to the memory media track.

21. The sensor of claim 18, wherein the sense current travels through the stack in a direction substantially parallel to the memory media track.

22. The sensor of claim 18, wherein the insulating layer is configured to be a non-metallic spacer.

23. A magnetoresistive read sensor comprising: first and second electrodes, a stack positioned between the electrodes, the stack comprising a first free layer and a second free layer, and a tunneling barrier positioned between the first and second free layers;
    a biasing member positioned adjacent the stack to bias a first magnetization vector of the first free layer orthogonal to a second magnetization vector of the second free layer; and
    wherein a current is passed between the first and second free layers of the stack and the amount of current passing through the first and second free layer changes based upon the magnetization orientation of the first and second free layers relative to each other.

24. The sensor of claim 23, wherein the tunneling barrier is configured to be a non-metallic spacer.

25. The sensor of claim 23, further comprising an air bearing surface and a rear surface, wherein the biasing member is positioned adjacent the rear surface.

26. The sensor of claim 25, wherein the biasing member comprises an AFM layer positioned in the stack adjacent each of the free layers.

27. The sensor of claim 23, wherein the free layers are biased orthogonal to each other due to their shape induced anisotropy.

28. The sensor of clam 23, wherein the free layers are biased by another in stack soft biased layer of AFM/FM pair on top and underneath the free layers.

29. The sensor of claims 23, wherein the tunneling barrier is configured to be an insulating layer with a nanobridge in the insulating layer connecting the first and second free layers.

30. The sensor of claim 23, wherein the tunneling barrier is configured to be an oxide pinhole mesh.

* * * * *